United States Patent
Seacat et al.

(10) Patent No.: US 7,486,868 B1
(45) Date of Patent: Feb. 3, 2009

(54) LIGHT-EMITTING FIBERS INTERTWINED IN GRASS RELATED TO A PLAYER'S OR GAME OBJECT'S POSITION

(75) Inventors: Lisa Anne Seacat, San Francisco, CA (US); Travis M. Grigsby, Austin, TX (US); Steven Michael Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/832,336

(22) Filed: Aug. 1, 2007

(51) Int. Cl.
*G02B 6/00* (2006.01)
(52) U.S. Cl. ............... 385/147; 385/116; 385/120
(58) Field of Classification Search ......... 385/147, 385/115–121
See application file for complete search history.

(56) References Cited

U.S. PATENT DOCUMENTS

| | | | | |
|---|---|---|---|---|
| 4,310,974 | A * | 1/1982 | Gdovin et al. | 434/42 |
| 6,398,399 | B1 * | 6/2002 | Neophytou | 362/576 |
| 6,950,599 | B2 * | 9/2005 | Nicholls et al. | 385/147 |
| 7,245,815 | B2 * | 7/2007 | Nicholls et al. | 385/147 |
| 2006/0180647 | A1 | 8/2006 | Hansen | |

FOREIGN PATENT DOCUMENTS

JP 2006040052 2/2006

OTHER PUBLICATIONS

"Top Secret Sportexe Sci-fi Synthetic Leaks—Word's Out!," http://www.omnigrass.com/turf_news_turf_tv.htm; Sportexe 2007.
Burke, Monte, "Field of Screens," http://www.forbes.com/forbes/2006/1127/058_print.html, forbes.com, Nov. 27, 2006.

* cited by examiner

*Primary Examiner*—Frank G Font
*Assistant Examiner*—Eric Wong
(74) *Attorney, Agent, or Firm*—Robert A. Voigt, Jr.; Winstead, P.C.; Robert E. Straight, II

(57) ABSTRACT

A method, system and computer program product for improving accuracy and experience of a game. Signals are sent from a computer system to appropriate sensors based on a player's or game object's position to activate connected light-emitting fibers that are blended with grass on a playing field. The light-emitting fibers are activated in such a manner to display light to indicate an infraction (e.g., a player was in an offside position), a successful play (e.g., team made a first down), appropriate maneuvers, boundaries for a play, etc., thereby ensuring the game is fair and accurate and enhancing the experience of the game.

3 Claims, 5 Drawing Sheets

LIGHT-EMITTING FIBERS INTERTWINED IN GRASS RELATED TO A PLAYER'S OR GAME OBJECT'S POSITION

CROSS REFERENCE TO RELATED APPLICATIONS

The present invention is related to the following U.S. patent application which is incorporated herein by reference:

Ser. No. 11/832,351 entitled "Improving Accuracy and Experience of Game by Activating Appropriate Light-Emitting Fibers Intertwined in Grass Related to a Game Object or Player Entering or Leaving a Hot Zone Area" filed Aug. 1, 2007.

TECHNICAL FIELD

The present invention relates to the field of sports, and more particularly to improving the accuracy and experience of a game by activating appropriate light-emitting fibers that are intertwined in grass on a playing field in order to display dynamic lines indicting infractions, successful plays, appropriate maneuvers, boundaries for a play, etc.

BACKGROUND INFORMATION

Sports is an activity that is governed by a set of rules or customs and often engaged in competitively. Sports commonly refers to activities where the physical capabilities of the competitor are the sole or primary determiner of the outcome (winning or losing), but the term is also used to include activities such as mind sports and motor sports where mental acuity or equipment quality are major factors. Sports are used as entertainment for the player and the viewer. It has also been proven by experiments that daily exercise increases mental strength and power to study.

Technology is playing an important role in sports, whether applied to an athlete's health, the athlete's technique, equipment's characteristics or even ensuring a fair game. For example, a system referred to as "instant replay" has been implemented in several sports (e.g., football, hockey, college football, basketball, tennis, rugby, etc.) where plays in a sporting match can be reviewed (or replayed) using recorded video feeds of the sporting match in order to ensure that the correct call is made on the play. However, instant replay is usually limited to being used in certain situations. For example, goals in hockey can only be reviewed in the following situations: puck crossing the goal line completely; puck in the net prior to the end of the period; puck in the net prior to goal frame being dislodged; puck being directed into the net by hand or foot; puck in the net after deflecting directly off an official; and puck deflected into the goal by the high stick by an attacking player. Hence, many calls are still subject to human error. Further, even with instant replay, mistakes may still occur as usually a referee, a replay judge, etc., can only overturn a call if the call is clearly in error. Hence, a call may be incorrect but if there is not enough evidence to show the call to be clearly incorrect, the call will stand.

Recently, a synthetic turf system used on a game field has been developed that includes blades of polyethylene grass blended with light-emitting fibers with the capability of reflecting light upwards. The fiber-optical laden blades are supposed to have the same look, feel and durability as non-illuminated blades. This system is commonly being referred to as "Turf TV" as the fiber-optical blades can be used to display team logos and even commercial viewing.

As technology continues to play an important role in sports, it would be desirable if this fiber optic field technology could be used to ensure the game is even more fair and accurate than under the current system of instant replay thereby enhancing the experience of the game.

SUMMARY

The problems outlined above may at least in part be solved in some embodiments by activating the appropriate light-emitting fibers on the playing field based on a player's or game object's position to display light in such a manner as to indicate an infraction (e.g., a player was in an offside position), a successful play (e.g., team made a first down), appropriate maneuvers, boundaries for a play, etc., thereby ensuring the game is fair and accurate and enhancing the experience of the game.

In one embodiment of the present invention, a method for improving accuracy and experience of a game comprises the step of sending signals to appropriate sensors to activate appropriate light-emitting fibers blended with grass on a field. The method further comprises activating the appropriate light-emitting fibers to give off light.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for improving accuracy and experience of a game. In one embodiment of the present invention, signals are sent from a computer system to appropriate sensors based on a player's or game object's position to activate connected light-emitting fibers that are blended with grass on a playing field. The light-emitting fibers are activated in such a manner as to display light to indicate an infraction (e.g., a player was in an offside position), a successful play (e.g., team made a first down), appropriate maneuvers, boundaries for a play, etc., thereby ensuring the game is fair and accurate and enhancing the experience of the game.

While the following discusses the present invention in connection with sports, the principles of the present invention may be applied to other events, such as half-time shows for a band or a dance team. For example, dynamic lines may be displayed on the playing field indicating where particular band or dance team members need to be on the field. The principles of the present invention may be applied to any event that uses a field. Further, a person of ordinary skill in the art would be capable of applying the principles of the present invention to any event that uses a playing field. Further, embodiments covering such permutations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figures 1A, 1B:
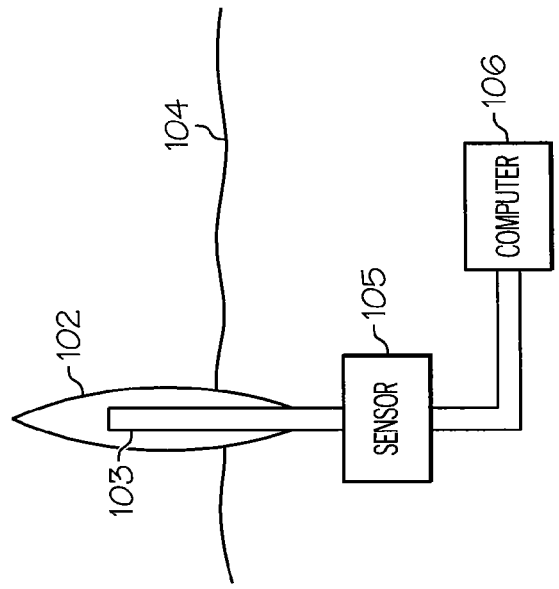
FIGS. 1A-B illustrate a game field incorporating optical field technology in accordance with an embodiment of the present invention.

FIGS. 1A-B—Game Field Implementing Grass Blended With Fiber Optic Blades

FIG. 1A illustrates an embodiment of the present invention of a game playing field 100 (e.g., soccer field, football field) where field 100 is divided into "trays" 101A-X that may be square shaped. Trays 101A-X may collectively or individually be referred to as trays 101 or tray 101, respectively. It is noted that trays 101 may be configured in a different shape than a square and that FIG. 1A is illustrative. Further, field 100 may include any number of trays 101 (e.g., 1,750 trays) that are interconnected with each other. Each tray 101 may include thousands of blades of grass 102 (e.g., polyethylene grass), blended with light-emitting fibers 103 (e.g., optical fibers), that reflect light upwards from tray 101 as illustrated in FIG. 1B.

FIG. 1B illustrates one of the thousands of blades of grass 102 in tray 101 in accordance with an embodiment of the present invention. Referring to FIG. 1B, each blade of grass 102 may be positioned in or on the soil 104 or other material. A portion of or all of the thousands of blades of grass 102 in tray 101 may each be blended with a light-emitting fiber 103. Light-emitting fiber 103 may be connected to a sensor 105 configured to detect the obscuring of light thereby indicating the movement of a ball or a player passing light-emitting fiber 103. Sensor 105 may further be configured to activate the connected light-emitting fiber 103 thereby allowing light-emitting fiber 103 to provide light of a certain color (including white light). Each sensor 105 may be connected to a computer 106 configured to control the activation of light-emitting fibers 103 in each tray 101 in field 100 as discussed further below in connection with FIGS. 3-5. A more detail discussion of computer system 106 is provided below in connection with FIG. 2.

Figure 2:
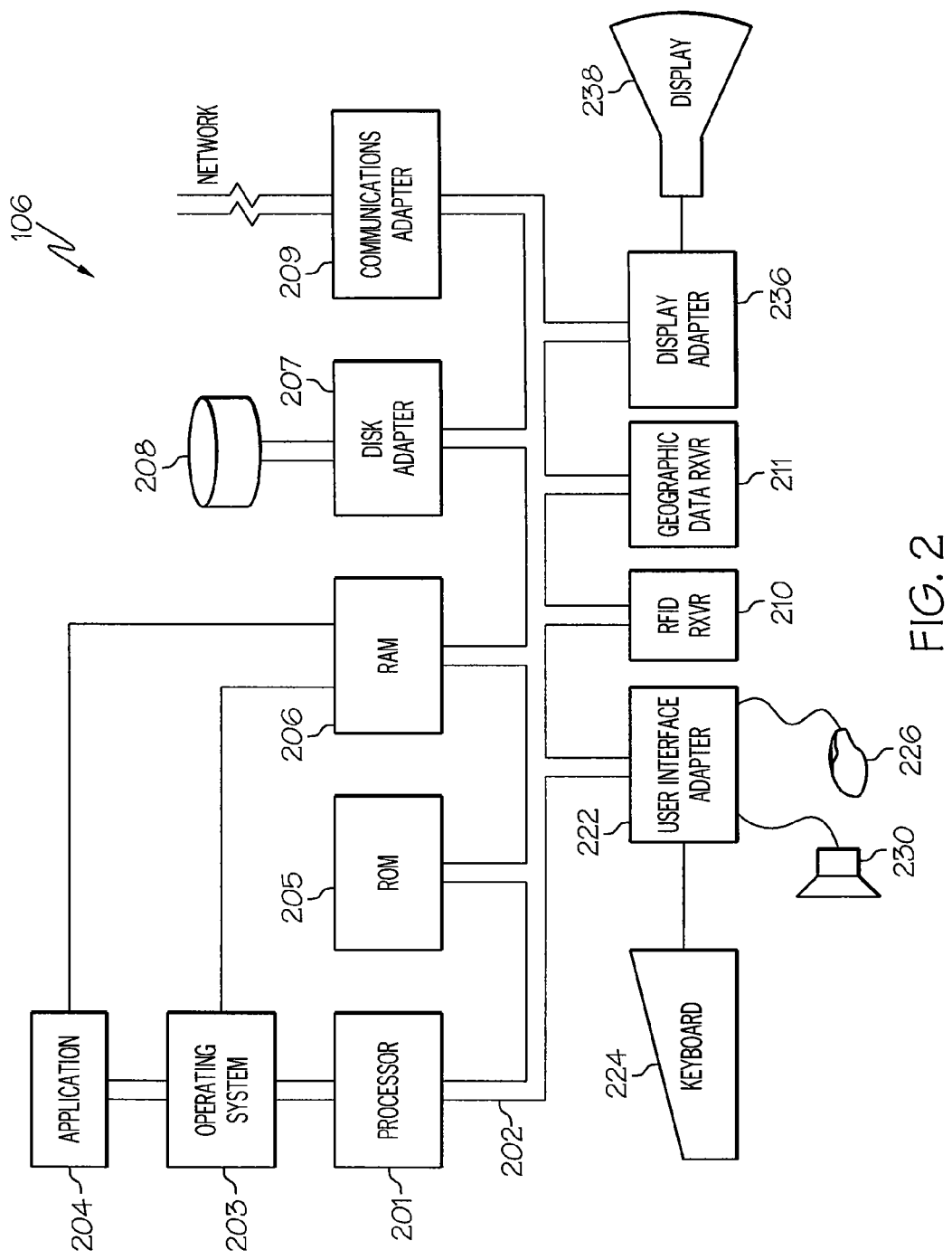
FIG. 2 illustrates a hardware configuration of a computer system in accordance with an embodiment of the present invention.

FIG. 2—Computer System

FIG. 2 illustrates an embodiment of a hardware configuration of computer system 106 (FIG. 1B) which is representative of a hardware environment for practicing the present invention. Computer system 106 may have a processor 201 coupled to various other components by system bus 202. An operating system 203 may run on processor 201 and provide control and coordinate the functions of the various components of FIG. 2. An application 204 in accordance with the principles of the present invention may run in conjunction with operating system 203 and provide calls to operating system 203 where the calls implement the various functions or services to be performed by application 204. Application 204 may include, for example, a program for improving the accuracy and experience of a game by implementing fiber optic field technology as discussed further below in association with FIGS. 3-5.

Referring to FIG. 2, read-only memory ("ROM") 205 may be coupled to system bus 202 and include a basic input/output system ("BIOS") that controls certain basic functions of computer system 106. Random access memory ("RAM") 206 and disk adapter 207 may also be coupled to system bus 202. It should be noted that software components including operating system 203 and application 204 may be loaded into RAM 206, which may be computer system's 106 main memory for execution. Disk adapter 207 may be an integrated drive electronics ("IDE") adapter that communicates with a disk unit 208, e.g., disk drive. It is noted that the program for improving the accuracy and experience of a game by implementing fiber optic field technology, as discussed further below in association with FIGS. 3-5, may reside in disk unit 208 or in application 204.

Referring to FIG. 2, computer system 106 may further include a communications adapter 209 coupled to bus 202. Communications adapter 209 may interconnect bus 202 with a network (e.g., local area network ("LAN"), wide area network ("WAN")) to allow computer system 106 to communicate with sensors 105 (FIG. 1B).

Computer system 106 may further include a radio frequency identification receiver 210 (indicated as "RFID RXVR" in FIG. 2) configured to receive data sent from a radio frequency identification ("RFID") chip or tag that may be placed on an object (e.g., soccer ball), on a player or in a player's equipment (e.g., football helmet, player's shoe). The RFID chip or tag stores data that may be thought of as an "electronic label" or a "code plate" that uniquely identifies items or players. Hence, upon RFID RXVR 210 receiving radio frequency identification tag data, application 204 may be configured to read the tag data and determine the object (e.g., soccer ball) or player (e.g., Joe Smith) associated with the tag data.

In connection with receiving the tag data, computer system 106 may further receive geographic information via a geographic data receiver 211 (indicated as "Geographic Data RXVR" in FIG. 2). The geographic information may include global positioning system ("GPS") data from a GPS receiver which may be placed inside a ball (e.g., football, soccer ball) or on a player or in a player's equipment (e.g., football helmet, player's shoe). As is commonly known in the art, the GPS receiver uses triangulation to determine its location. The GPS receiver may relay position data to geographic data receiver 211, such as by using the NMEA 0183 protocol. Upon receiving the position data along with the tag data, computer system 106 is able to determine the position of the ball or the identified player on field 100 (FIG. 1A).

Referring to FIG. 2, input/output ("I/O") devices may also be connected to computer system 106 via a user interface adapter 222 and a display adapter 236. Keyboard 224, mouse 226 and speaker 230 may all be interconnected to bus 202 through user interface adapter 222. Data may be inputted to computer system 106 through any of these devices. A display monitor 238 may be connected to system bus 202 by display adapter 236. In this manner, a user is capable of inputting to computer system 106 through keyboard 224 or mouse 226 and receiving output from computer system 106 via display 238 or speaker 230.

The various aspects, features, embodiments or implementations of the invention described herein can be used alone or in various combinations. The methods of the present invention can be implemented by software, hardware or a combination of hardware and software. The present invention can also be embodied as computer readable code on a computer readable medium. The computer readable medium is any data storage device that can store data which can thereafter be read by a computer system. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

Figure 3:
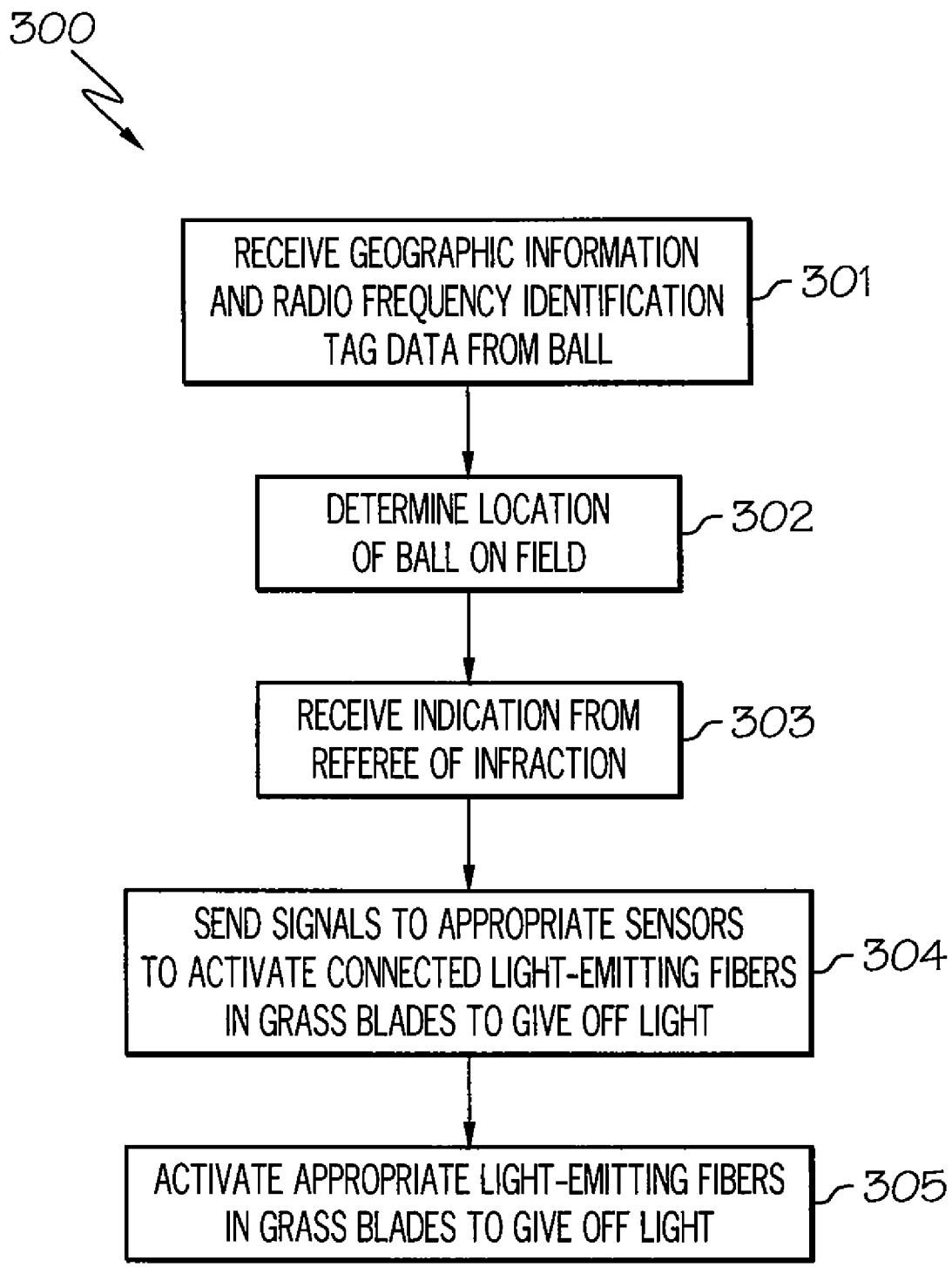
FIG. 3 is a flowchart of a method for drawing dynamic lines on the field to indicate an appropriate distance from an object in accordance with an embodiment of the present invention.
Figure 4:
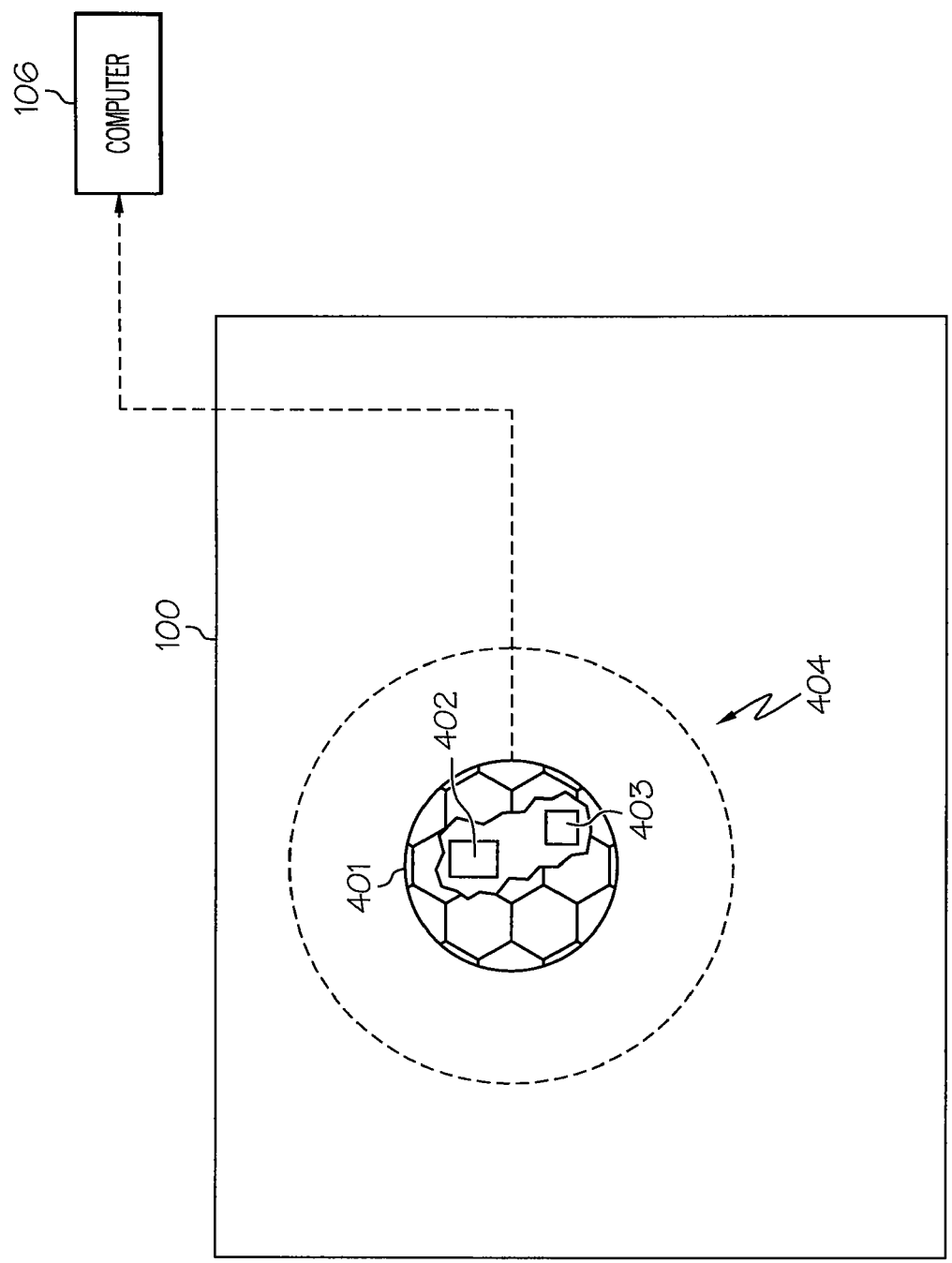
FIG. 4 is a diagram illustrating appropriate light-emitting fibers being activated in a manner that displays a ten yard circle around a ball in accordance with an embodiment of the present invention.
Figure 5:
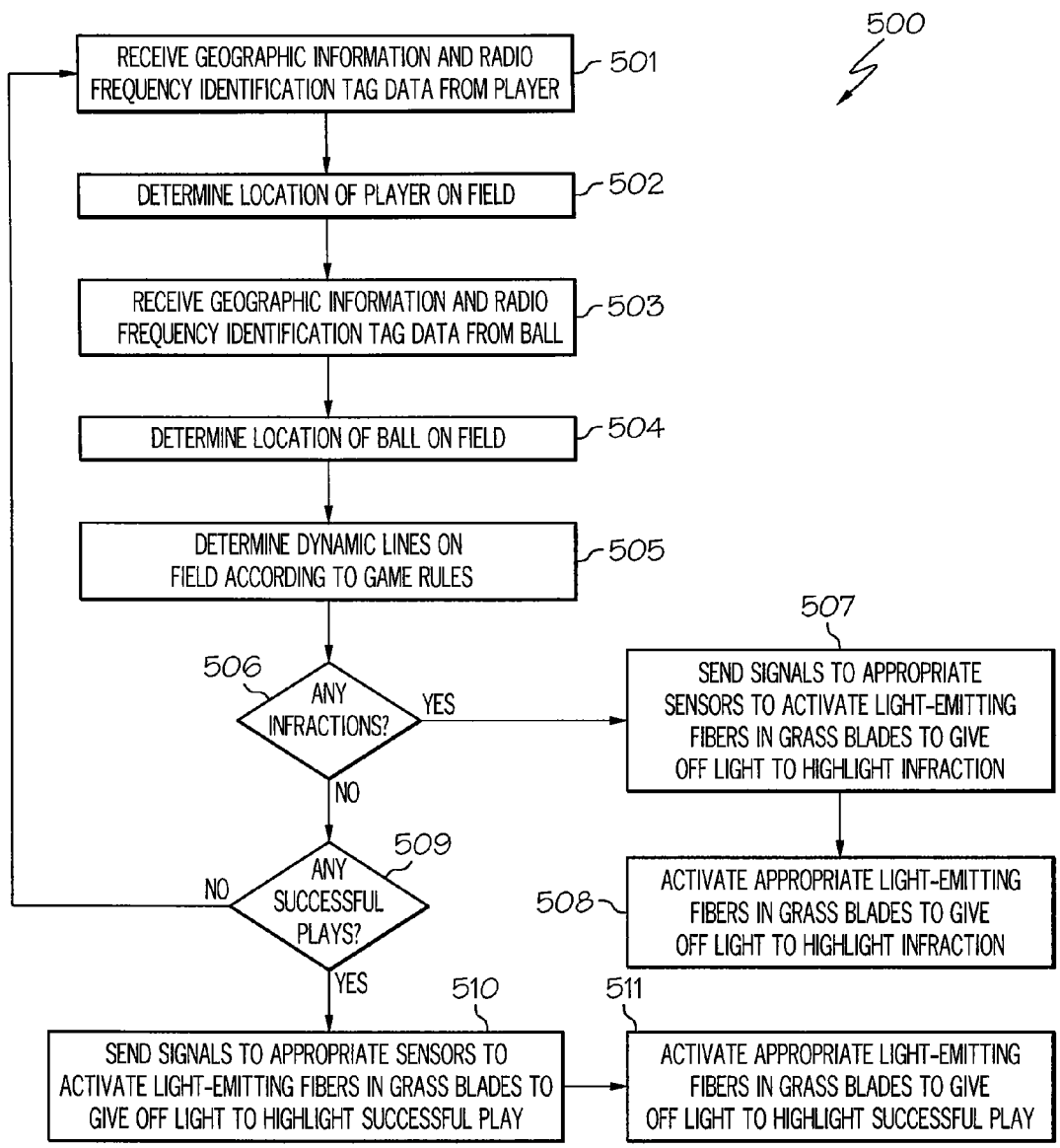
FIG. 5 is a flowchart of a method for drawing dynamic lines on the field to highlight an infraction, a successful play, etc., based on game rules in accordance with an embodiment of the present invention.

As stated in the Background Information section, technology is playing an important role in sports, whether applied to an athlete's health, the athlete's technique, equipment's characteristics or even ensuring a fair game. For example, a system referred to as "instant replay" has been implemented in several sports (e.g., football, hockey, college football, basketball, tennis, rugby, etc.) where plays in a sporting match can be reviewed (or replayed) using recorded video feeds of the sporting match in order to ensure that the correct call is made on the play. However, instant replay is usually limited to being used in certain situations. Hence, many calls are still subject to human error. Further, even with instant replay, mistakes may still occur as usually a referee, a replay judge, etc., can only overturn a call if the call is clearly in error. Hence, a call may be incorrect but if there is not enough evidence to show the call to be clearly incorrect, the call will stand. Recently, a synthetic turf system used on a game field has been developed that includes blades of polyethylene grass blended with light-emitting fibers with the capability of reflecting light upwards. The fiber-optical laden blades are supposed to have the same look, feel and durability as non-illuminated blades. This system is commonly being referred to as "Turf TV" as the fiber-optical blades can be used to display team logos and even commercial viewing. As technology continues to play an important role in sports, it would be desirable if this fiber optic field technology could be used to ensure the game is even more fair and accurate than under the current system of instant replay thereby enhancing the experience of the game. The fiber optic field technology, as discussed in connection with FIGS. 1A-B, is used to ensure the game is more fair and accurate than the current system of instant replay as discussed further below in connection with FIGS. 3-5. FIG. 3 is a flowchart of a method for drawing dynamic lines on field 100 (FIG. 1A) to indicate an appropriate distance from an object (e.g., soccer ball) on field 100 to begin a play (e.g., direct free kick in soccer). FIG. 4 is a diagram illustrating appropriate light-emitting fibers 103 being activated in a manner that displays a circle around a soccer ball with a radius of ten yards, where a "direct free kick" in soccer requires the opponents to be beyond ten yards from the location of the soccer ball. FIG. 5 is a flowchart of a method for drawing dynamic lines on field 100 to highlight an infraction, a successful play, etc. based on game rules.

FIG. 3—Method for Drawing Dynamic Lines on the Playing Field to Indicate an Appropriate Distance From an Object FIG. 3 is a method 300 for drawing dynamic lines on field 100 (FIG. 1A) to indicate an appropriate distance from an object (e.g., soccer ball) in accordance with an embodiment of the present invention.

Referring to FIG. 3, in conjunction with FIGS. 1-2, in step 301, computer system 106 receives geographic information and radio frequency identification tag data from a ball on field 100. For example, the ball (e.g., soccer ball) may be equipped with both a global positioning system receiver and a radio frequency tag as illustrated in FIG. 4. Referring to FIG. 4, FIG. 4 is a diagram illustrating appropriate light-emitting fibers 103 being activated in a manner that displays a circle around a soccer ball 401 in accordance with an embodiment of the present invention. As illustrated in FIG. 4, soccer ball 401 may be equipped with a GPS receiver 402 and a RFID tag 403. Both GPS receiver 402 and RFID tag 403 may be configured to transmit geographic and radio frequency identification tag data, respectively, to computer system 106.

Returning to FIG. 3, in conjunction with FIGS. 1-2, in step 302, computer system 106 determines the location of the ball on field 100 based on the geographic information received from the ball in step 301. Further, computer system 106 identifies the ball based on the received radio frequency identification tag data in step 301 thereby associating the received geographic information with the ball.

In step 303, computer system 106 receives an indication from a referee, directly or indirectly, of an infraction. For example, computer system 106 may receive an indication of a foul (e.g., pushing, tripping) in the game of soccer thereby necessitating awarding the opposing team a "direct free kick." For a direct free kick, the soccer ball should be stationary and opponents must remain ten yards from the ball until the ball is in play.

In step 304, computer system 106 sends signals to appropriate sensors 105 to activate connected light-emitting fibers 103 in grass blades 102 to give off light. For example, computer system 106, after determining the location of the ball in step 302, may send signals to appropriate sensors 105 that are located ten yards from the ball to activate those connected light-emitting fibers 103 to give off light.

In step 305, the appropriate light-emitting fibers 103 in grass blades 102 are activated to give off light. For example, referring to FIG. 4, computer system 106, after determining the location of soccer ball 401 in step 302, may send signals to appropriate sensors 105 that are located ten yards from ball 401 to activate those connected light-emitting fibers 103 to give off light thereby displaying a lighted circle 404 with a radius of ten yards from soccer ball 401. By displaying lighted circle 404, referees can accurately determine if an opposing player is within ten yards from soccer ball 401 thereby ensuring the game is fair and accurate and enhancing the experience of the game. It is noted that the line, circle, etc., may be displayed for a specified duration of time or until the game or field condition or information has been updated or changed.

While FIG. 3 was discussed in connection with an example of a direct free kick in soccer, the principles of the present invention of FIG. 3 may be applied to other sports and other infractions where a location from the game playing object (e.g., football) is important in ensuring the game is fair and accurate. It is noted that a person of ordinary skill in the art would be capable of applying the principles of the present invention of FIG. 3 to other sports and other infractions where a location from the game playing object is important in ensuring the game is fair and accurate. Further, embodiments covering such permutations would fall within the scope of the present invention.

Further, while FIG. 3 was discussed in connection with an example of a direct free kick in soccer, the principles of the present invention of FIG. 3 may be applied to determining the location of any game playing object (e.g., baseball bat). It is noted that a person of ordinary skill in the art would be capable of applying the principles of the present invention of FIG. 3 to determining the location of any game playing object (e.g., baseball bat). Further, embodiments covering such permutations would fall within the scope of the present invention.

Method 300 may include other and/or additional steps that, for clarity, are not depicted. Further, method 300 may be executed in a different order presented and that the order presented in the discussion of FIG. 3 is illustrative. Additionally, certain steps in method 300 may be executed in a substantially simultaneous manner or may be omitted.

A method for drawing dynamic lines on field 100 to highlight an infraction, a successful play, etc. based on game rules is now discussed below in association with FIG. 5.

FIG. 5—Method for Drawing Dynamic Lines on the Playing Field to Indicate an Infraction, Successful Play, etc. Based on Game Rules FIG. 5 is a method 500 for drawing dynamic lines on field 100 (FIG. 1A) to indicate an infraction, a successful play, etc. based on game rules.

Referring to FIG. 5, in conjunction with FIGS. 1-2, in step 501, computer system 106 receives geographic information and radio frequency identification tag data from a player on field 100. For example, the player's equipment (e.g., helmet, shoe) may be equipped with both a global positioning system receiver and a radio frequency tag. Both the global positioning system receiver and the radio frequency tag may be configured to transmit geographic and radio frequency identification tag data, respectively, to computer system 106.

In step 502, computer system 106 determines the location of the player on field 100 based on the geographic information received from the player in step 501. Further, computer system 106 identifies the player based on the received radio frequency identification tag data in step 501 thereby associating the received geographic information with the player. In addition to determining the location of the player on field 100, computer system 106 may determine the orientation of the player based on multiple geographic data received from the player over a period of time. For example, computer system 106 may determine that the player is running in a northwest manner based on multiple received geographic data from the player.

In step 503, computer system 106 receives geographic information and radio frequency identification tag data from a ball on field 100. For example, a football may be equipped with both a global positioning system receiver and a radio frequency tag. Both the global positioning system receiver and the radio frequency tag may be configured to transmit geographic and radio frequency identification tag data, respectively, to computer system 106.

In step 504, computer system 106 determines the location of the ball on field 100 based on the geographic information received from the ball in step 503. Further, computer system 106 identifies the ball based on the received radio frequency identification tag data in step 503 thereby associating the received geographic information with the ball.

In step 505, computer system 106 determines dynamic lines on field 100 according to game rules. "Dynamic lines," as used herein, refers to lines, circles, squares, etc., that are generated, but not displayed on field 100, that indicate boundaries for an infraction, a successful play, etc. For example, computer system 106 may dynamically determine a line which indicates an offside position in soccer.

In step 506, computer system 106 determines whether there are any infractions based on the game rules and the location of the players on field 100. For example, computer system 106 determines whether a soccer player is in an offside position. If there is an infraction, then, in step 507, computer system 106 sends signals to appropriate sensors 105 to activate connected light-emitting fibers 103 in grass blades 102 to give off light to highlight the infraction. For example, computer system 106, after determining a player is in an offside position, may send signals to appropriate sensors 105 that are located at the offside position to activate those connected light-emitting fibers 103 to give off light.

In step 508, the appropriate light-emitting fibers 103 in grass blades 102 are activated to give off light to highlight the infraction. For example, the light-emitting fibers 103 may be activated in a manner to highlight that a player was in an offside position. By displaying light on field 100 in a manner to indicate an infraction (e.g., a player was in an offside position), referees can accurately determine if an infraction has occurred thereby ensuring the game is fair and accurate and enhancing the experience of the game.

If, however, there was no infraction, then, in step 509, computer system 106 determines whether there are any successful plays based on the game rules and the location of the players on field 100. For example, computer system 106 determines whether the football past the first down line. If the football past the first down line, then, in step 510, computer system 106 sends signals to appropriate sensors 105 to activate connected light-emitting fibers 103 in grass blades 102 to give off light to highlight the fact that the team made a first down. For example, computer system 106, after determining a first down has been made, may send signals to appropriate sensors 105 that are located at the first down line to activate those connected light-emitting fibers 103 to give off light.

In step 510, the appropriate light-emitting fibers 103 in grass blades 102 are activated to give off light to highlight the successful play. For example, the light-emitting fibers 103 may be activated in a manner to highlight that a team made a first down. By displaying light on field 100 in a manner to indicate a successful play (e.g., team made a first down), referees can accurately determine if a successful play has occurred thereby ensuring the game is fair and accurate and enhancing the experience of the game.

If, however, there was not a successful play, then computer system 106 receives additional geographic information and radio frequency identification tag data from a player on field 100 in step 501.

While FIG. 5 was discussed in connection with examples of displaying light to highlight infractions, such as being offside in soccer, or successful plays, such as making a first down in football, the principles of the present invention of FIG. 5 may be applied to other sports and other infractions or successful plays where an infraction or successful play is based on the position of a playing object and/or player(s). It is noted that a person of ordinary skill in the art would be capable of applying the principles of the present invention of FIG. 5 to other sports and other infractions or successful plays where an infraction or successful play is based on the position of a playing object and/or player(s). Further, embodiments covering such permutations would fall within the scope of the present invention.

Further, while FIG. 5 was discussed in connection with displaying light to indicate infractions or successful plays, the principles of the present invention of FIG. 5 may be applied to displaying light: to indicate the direction of a player; to guide an individual (e.g., a player, a band member) to perform a particular play, stance, orientation, etc., to improve their skills; to indicate a huddle, and so forth. It is noted that a person of ordinary skill in the art would be capable of applying the principles of the present invention of FIG. 5 to display light to indicate other aspects of the game other than infractions or successful plays. Further, embodiments covering such permutations would fall within the scope of the present invention.

Method 500 may include other and/or additional steps that, for clarity, are not depicted. Further, method 500 may be executed in a different order presented and that the order presented in the discussion of FIG. 5 is illustrative. Additionally, certain steps in method 500 (e.g., steps 501 and 503; and steps 502 and 504) may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for improving accuracy and experience of a game comprising the steps of:
   sending signals to appropriate sensors to activate appropriate light-emitting fibers blended with grass on a field;
   activating said appropriate light-emitting fibers to give off light;
   receiving geographic information from a game object;
   determining location of said game object on said field; and
   receiving an indication from a referee of an infraction;
   wherein said appropriate light-emitting fibers are activated to give off light in a manner that indicates an appropriate distance from said game object on said field.

2. A method for improving accuracy and experience of a game comprising the steps of:
   sending signals to appropriate sensors to activate appropriate light-emitting fibers blended with grass on a field:
   activating said appropriate light-emitting fibers to give off light; and
   determining dynamic lines on said field according to game rules;
   wherein said signals are sent to said appropriate sensors to activate said appropriate light-emitting fibers to highlight one of the following: an infraction and a successful play.

3. A method for improving accuracy and exerience of a game comprising the steps of:
   sending signals to appropriate sensors to activate appropriate light-emitting fibers blended with grass on a field; and
   activating said appropriate light-emitting fibers to give off light;
   wherein said signals are sent to said appropriate sensors to activate said appropriate light-emitting fibers to perform one or more of the following: guide an orientation of an individual, highlight a direction of a player, and highlight a huddle.

* * * * *